United States Patent [19]

Bühler et al.

[11] 4,224,025

[45] Sep. 23, 1980

[54] PROCESS FOR THE DYEING AND PRINTING OF PAPER MATERIALS IN DIFFERENT HUES USING A SINGLE COUPLING COMPONENT

[75] Inventors: Arthur Bühler, Rheinfelden; Franz H. Nedwed, Aesch, both of Switzerland

[73] Assignee: Ciba-Geigy Corporation, Ardsley, N.Y.

[21] Appl. No.: 941,433

[22] Filed: Sep. 11, 1978

Related U.S. Application Data

[63] Continuation of Ser. No. 402,672, Oct. 2, 1973, abandoned.

[30] Foreign Application Priority Data

Oct. 4, 1972 [CH] Switzerland ................... 14559/72

[51] Int. Cl.² .............................................. D21H 1/46
[52] U.S. Cl. .......................................... 8/466; 8/645; 8/669; 8/667; 8/670
[58] Field of Search ............................ 8/7, 46, 25, 26

[56] References Cited

FOREIGN PATENT DOCUMENTS

| 461042 | 2/1937 | United Kingdom . |
| 1275730 | 5/1972 | United Kingdom . |
| 1285339 | 8/1972 | United Kingdom . |

OTHER PUBLICATIONS

Lips, H. A. Paper Trade Journal, 1944, 118, TAPPI, 105–108.

*Primary Examiner*—A. Lionel Clingman
*Attorney, Agent, or Firm*—Edward McC. Roberts

[57] ABSTRACT

A process is described for the dyeing and printing of paper materials by the use of developing dyestuffs, in which process diazo components and heterocyclic coupling components containing a 6-membered heterocyclic radical having one ring nitrogen atom are applied in any sequence, either successively or simultaneously onto or into the paper material to be dyed or printed, and coupled together in alkaline, neutral or acid medium, whereby it is possible using only a single coupling component to obtain on the material, merely by variation of the diazo component, a shade of color ranging from yellow to black.

3 Claims, No Drawings

PROCESS FOR THE DYEING AND PRINTING OF PAPER MATERIALS IN DIFFERENT HUES USING A SINGLE COUPLING COMPONENT

This is a continuation of application Ser. No. 402,672, filed on Oct. 2, 1973.

The invention relates to a process for the dyeing and printing of paper materials by the use of developing dyestuffs, as well as to the paper materials dyed and printed according to this process.

The process according to the invention is one in which diazo components and heterocyclic coupling components containing a 6-membered heterocyclic radical having one ring nitrogen atom are applied in any sequence, successively or simultaneously, onto or into the material to be dyed or printed, and coupled together. The coupling, i.e. the creation of the dyestuff, hence occurs on or in the material being dyed or printed. It is preferable that the heterocyclic coupling component be applied or introduced first, with the diazo component then being allowed to act on the material pretreated in this manner.

The developing dyestuffs of the process according to the invention which contain as radical of the coupling component a 6-membered heterocyclic radical having one ring nitrogen atom are, in particular, azo dyestuffs of the formula

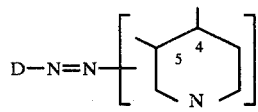
(1)

wherein the heterocyclic radical is bound in the 4- or 5-position to the azo group, and whereby further substituents can be bound to the remaining free positions of the heterocyclic radical, or further rings, particularly aromatic 6-membered rings, can be bound by condensation to these positions, and whereby the heterocyclic ring can contain double bonds. The symbol D denotes the radical of a diazo component.

The 6-membered heterocyclic coupling components used for the formation of these dyestuffs correspond, in particular, to the formula

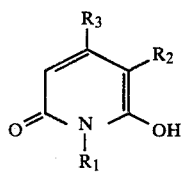
(2)

wherein the substituents $R_1$, $R_2$ and $R_3$ can have the meanings given below:

$R_1$: hydrogen, an alkyl group such as methyl, ethyl, propyl isopropyl, butyl, hydroxyethyl, cyanoethyl, or an alkyl group substituted by halogen such as fluorine, chlorine or bromine, hydroxyl, an alkoxy group such as methoxy, ethoxy, propyloxy, isopropyloxy or hydroxyethoxy, a quaternary ammonium group such as the trimethylammonium group, or an acylamino group such as acetylamino, chloroacetylamino or benzoylamino, an acylaminoalkyl group in which the acyl radical is fibre-reactive, such as chloroacetylaminomethyl, α,β-dibromopropionylaminoethyl, 2,4-dichlorotriazinyl-(6)-aminoethyl, [6-(2'-chloro-4'-(3''-sulphophenylamino)-triazinyl-(6)-amino)hexylene], [6-(2'-chloro-4'-(2'',5''-disulphophenylamino)-triazinyl-(6)-amino)hexylene], [6-(2'-chloro-4'-(2'',5''-disulphophenylamino)-triazinyl-(6)-amino)ethylene], an aralkyl group such as benzyl, an aryl radical such as phenyl, 1- or 2-naphthyl, 2,5-dichlorophenyl or 3-sulphophenyl, a heterocyclic radical such as the radical of 1-phenyl-3-methyl-pyrazolone-(5) or of pyridine, an alkylene radical which binds the radical of formula (2) with a further similar heterocyclic radical, an amino group, e.g. $H_2N-$, an alkylamino, N,N-dialkylamino, N-alkyl-N-arylamino or arylamino group, such as methylamino, N,N-diethylamino, N,N-dicyanoethylamino, phenylamino, N-methyl-N-phenylamino or N,N-diphenylamino groups;

$R_2$: hydrogen, an alkyl group such as methyl, ethyl, propyl or cyclohexyl, cyano, nitro, nitroso, $H_2N-$, an acylamino group such as acetylamino, propionylamino or benzoylamino and, in particular, an acylamino group in which the acyl radical is fibre-reactive, such as chloroacetylamino, α-bromoacryloylamino, α,β-dibromopropionylamino, 2,4,5-trichloropyrimidyl-(6)-amino, 2,6-difluoro-5-chloropyrimidyl-(4)-amino, 2,2,3,3-tetrafluorocyclobutyl-(1)-carbonylamino, 2,2,3,3-tetrafluorocyclobutyl-(1)-acryloylamino, 2,4-dichlorotriazinyl-(6)-amino or 2-chloro-4-amino-triazinyl-(6)-amino, an alkylcarbonyl or arylcarbonyl group such as acetyl, propionyl or benzoyl, a sulphonyl group such as methylsulphonyl, an aminosulphonyl group such as N-methylaminosulphonyl or N,N-diethylaminosulphonyl, an alkoxycarbonyl or aryloxycarbonyl radical such as methoxycarbonyl, ethoxycarbonyl, β-ethoxyethoxycarbonyl or phenoxycarbonyl, an aminocarbonyl group such as aminocarbonyl, N-methylaminocarbonyl or phenylaminocarbonyl, a halogen atom such as fluorine, chlorine or bromine, a sulphoalkyl group such as sulphomethyl, 1-sulphoethyl, 1-phenyl-1-sulphomethyl, an acylaminomethyl group in which the acyl radical preferably corresponds to the formula $-CO-R-X$, wherein R is an alkylene group, preferably a methylene group, and X is a halogen atom, a quaternised amino group or a sulpho group, such as $-COCH_2Cl$, $-COCH_2N^{\oplus}(R'R''R''')$ or $-COCH_2SO_3H$, a group of the formula

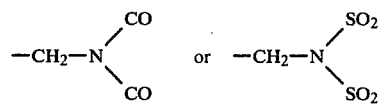

wherein the two $-CO-$ and $-SO_2-$ groups are bound in neighbouring position to a preferably 6-membered aromatic ring, the sulpho or carboxy group, a quaternised amino group or a group of the formula

in which the nitrogen atom is part of a 5-membered or, preferably, 6-membered ring that can contain further hetero atoms, such as nitrogen or oxygen atoms, e.g. the radical of pyridine, piperidine or benzimidazole;

R₃ hydrogen, an alkyl group such as methyl, ethyl, propyl, isopropyl, hydroxyethyl, methoxyethyl, cyanoethyl or butyl, an aralkyl radical such as benzyl, an aryl radical such as phenyl, 3-chlorophenyl, 3-sulphophenyl, 1- or 2-naphthyl, a heterocyclic radical such as benzthiazolyl or thiadiazolyl, the cyano group, an alkoxycarbonyl or aryloxycarbonyl radical such as methoxycarbonyl or phenoxycarbonyl, an aminocarbonyl group such as aminocarbonyl, N-methylaminocarbonyl, N,N-dimethylaminocarbonyl, N-ethylaminocarbonyl, N,N-di-cyanoethylaminocarbonyl, N,N-dihydroxyethylaminocarbonyl, N-phenylaminocarbonyl or N,N-diphenylaminocarbonyl, an alkoxycarbonylmethyl or aryloxycarbonylmethyl radical, such as methoxycarbonylmethyl or phenoxycarbonylmethyl, the cyanomethyl group, an acylmethyl group such as acetyl methyl, benzylcarbonylmethyl or benzoylmethyl, an aminocarbonylmethyl group such as N,N-dimethylaminocarbonylmethyl, the carboxy group or the hydroxymethyl group.

Further suitable coupling components are bicyclic systems of the formula

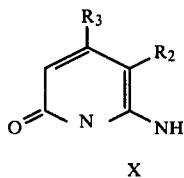
(3)

wherein R₂ and R₃ have the meanings given in the description of formula (2), and X represents a group —(CH₂)ₙ— wherein n is 2 or 3, or a radical of the formula

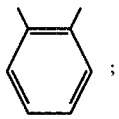

and of the formula

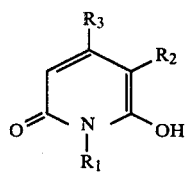
(4)

wherein R₁ has the meanings given in the description of formula (2), and R₂ and R₃ together with the carbon atoms of the pyridone ring to which carbon atoms they are bound form a 5- or 6-membered ring, e.g. compounds of the formulae

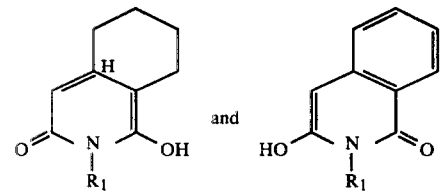

wherein R₁ has the meanings given in the description of formula (2), and H denotes the completely hydrogenated state of the ring concerned.

Of importance are also coupling components of formula 5

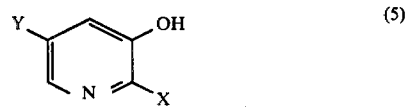
(5)

wherein
X represents the hydroxy or amino group, and
Y a hydrogen or halogen atom, particularly a bromine atom.

Important coupling components of the kind characterised by formulae (2) and (5) are, e.g.:
2,6-dihydroxy-3-cyano-4-methylpyridine,
1-ethyl-3-cyano-4-methyl-6-hydroxy-pyridone-(2),
1-β-hydroxyethyl-3-cyano-4-methyl-6-hydroxy-pyridone-(2),
1-benzyl-3-cyano-4-methyl-6-hydroxy-pyridone-(2),
1-ethyl-4-methyl-6-hydroxy-pyridone-(2),
2-amino-3-hydroxy-pyridine,
2-amino-3-hydroxy-5-bromopyridine,
1-[6-(2'-chloro-4'-(3''-sulphophenylamino)-triazinyl-(6)-amino)hexylene]-3-cyano-4-methyl-6-hydroxy-pyridone-(2),
1-methyl-3-aminocarbonyl-4-ethyl-6-hydroxy-pyridone-(2),
1-[6-(2'-chloro-4'-(2'',5''-disulphophenylamino)-triazinyl-(6)-amino)hexylene]-3-cyano-4-methyl-6-hydroxy-pyridone-(2),
1-[6-(2'-chloro-4'-(2'',5''-disulphophenylamino)-triazinyl-(6)-amino)ethylene]-3-cyano-4-methyl-6-hydroxy-pyridone-(2),
as well as compounds of the formulae

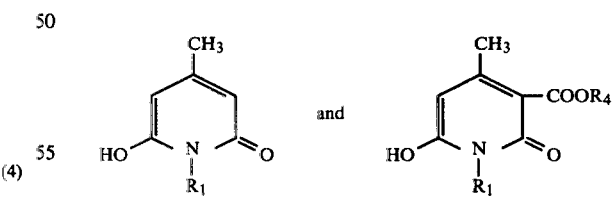

(6)     (7)

wherein R₁ has the meanings given in the description of formula (2), and R₄ represents an alkyl or aryl radical, such as methyl, ethyl, β-ethoxyethyl or phenyl.

The compounds of formulae (2), (3), (4), (6) and (7) can exist in several tautomeric forms. In order to simplify the description, the compounds in the formulae are presented in only one of these tautomeric forms. It is, however, expressly emphasised that the description, here and in the following, especially in the claims, relates always to compounds in any one of these tautomeric forms.

These coupling components are for the most part known, or can be obtained by known methods. The methods of preparation are described in:

The Chemistry of Heterocyclic Compounds, Pyridine and its Derivatives, Part I–IV, Interscience Publishers Inc., New York, Interscience Publishers Ltd., London; 1960–1964; also in: Berichte der Deutschen Chemischen Gesellschaft 29, (1896), page 655, as well as in numerous Patent Specifications, e.g.: Brit. Patent Spec. Nos. 1,256,094 and 1,256,095, Dutch Patent Specifications Nos. 71,06,678 and 71,09,361, U.S. Pat. No. 3,471,506, German 'Offenlegungsschriften' Nos. 1,964,690, 2,022,817, 2,118,945, 2,123,061 and 2,141,449, and others.

The diazo components used can be the aminoaryl compounds known from the chemistry of azo compounds, particularly aminobenzenes and aminonaphthalenes. Especially suitable for the process according to the invention are also the commerical diazo components and their salts.

The following are given as examples:
2- or 3-chloroaniline-hydrochloride,
2-, 3- or 4-nitroaniline,
2-methoxyaniline-hydrochloride,
2,5-dichloroaniline,
3,5-di-trifluoromethyl-aniline,
2-chloro-5-trifluoromethyl-aniline,
2-methoxy-5-chloro-aniline-hydrochloride,
3methyl-3-chloro-aniline-hydrochloride,
2-methyl-5-chloro-aniline-hydrochloride,
2-methyl-4-chloro-aniline-hydrochloride,
2-nitro-4-chloro-aniline,
2-trifluoromethyl-4-chloro-aniline,
2-nitro-4-methyl-aniline,
2-nitro-4-methoxy-aniline,
2-nitro-4-ethoxy-aniline,
2-methyl-4- or -5-nitroaniline,
2-methoxy-4- or -5-nitroaniline,
2-ethylsulphonyl-5-trifluoro-methyl-aniline,
3-ethylsulphonyl-6-methoxy-aniline,
3-N,N-diethylamino-sulphonyl-6-methoxy-aniline,
3-N-n-butylaminosulphonyl-6-methoxy-aniline,
1,4-diamino-2,6-dichlorobenzene,
2,4-dimethyl-3-nitro-aniline,
2-methoxy-4-methyl-5-nitro-aniline,
2-chloro-4-cyano-5-methyl-aniline,
2,5-dimethoxy-4-cyano-aniline-hydrochloride,
4-phenylamino-aniline,
2-methoxy-4-phenylamino-aniline,
4-(4'-methoxy-phenylamino)-aniline-hydrosulphate,
4,4"-diamino-diphenylamine-hydrosulphate,
2-phenylsulphonyl-aniline,
2-(4'-chloro-phenoxycarbonyl)-aniline,
3-benzylsulphonyl-6-methoxy-aniline,
2,5-diethoxy-4-(2'-methyl-phenoxyacetylamino)-aniline,
2,5-dimethoxy-4-(4'-methyl-phenoxyacetylamino)-aniline,
2,5-diethoxy-4-(4'-methyl-phenoxyacetylamino)-aniline,
2-phenoxy-5-chloro-aniline,
2-(4'-chlorophenoxy)-5-chloro-aniline or aniline-hydrochloride,
4-aminoazobenzene,
4-aminoazobenzene-hydrochloride,
3-methoxy-4-aminoazobenzene,
2',3-dimethyl-4-aminoazobenzene-hydrochloride,
2,3'-dimethyl-4-aminoazobenzene-hydrochloride,
2,5-dimethoxy-4'-nitro-4-amino-azobenzene,
2-methyl-5-methoxy-4,4'-diamino-azobenzene,
2-ethyl-5-methoxy-4-amino-4'-chloro-azobenzene,
2-methyl-5-methoxy-4-amino-2'-nitro-4'-methyl-azobenzene,
2-amino-4-methoxy-5-methyl-2'-chloro-4'-nitro-azobenzene,
2,5-dimethoxy-4-amino-2'-N,N-dimethylaminocarbonyl-4'-nitro-azobenzene,
2,5-dimethoxy-4-amino-2',6'-dichloro-4'-nitro-azobenzene,
2-chloro-4-benzoylamino-5-methoxy-aniline,
2,4-dimethyl-5-benzoylamino-aniline,
2-N,N-diethylaminosulphonyl-4-benzoylamino-5-methoxy-aniline,
2-methoxy-4-benzoylamino-5-methyl-aniline,
2,5-dimethoxy-4-benzoylamino-aniline,
2,5-diethoxy-4-benzoylamino-aniline,
benzidine,
3,3'-dimethylbenzidine,
3,3'-dimethoxybenzidine,
4-(1'-naphthylazo)-aniline,
1-(2'-ethoxyphenylazo)-4-amino-naphthalene,
2-methyl-4-amino-5-ethoxy-4'-(4"-aminophenylamino)azo-benzene,
1- or 2-aminonaphthalene,
3-benzoylamino-4-methoxy-aniline-hydrochloride,
1-amino-anthraquinone.

These components, both the coupling and the diazo components, are advantageously used as solutions, particularly as aqueous solutions.

The actual coupling to the defined heterocyclic compounds of formulae 2–7 is independent of pH-value, so that the coupling is possible not only in alkaline medium but also in a neutral or acid medium, i.e. in a pH-range of ca. 2 to 14. Such developing dyestuffs, therefore, can be also formed in, for example, a slightly acid solution.

Particularly valuable representatives among the mentioned coupling components, especially those of formula 2, render possible, merely by variation of the diazo component, the obtainment on the material of shades of colour ranging from light yellow to black, so that colour systems of developing dyestuffs containing only a single coupling component can be established.

The process according to the invention comprises (1) "impregnation," i.e. impregnation of the undyed material with one of the two components of the developing dyestuff, e.g. with the coupling component, and (2) "development," i.e. coupling with the second component, e.g. with the diazo component, that is, with the diazotised "dye base," or with the already diazotised "dye salt" present.

A high substantivity of one of the two components is in some cases desirable. This can be varied in the case of the coupling component by variation of the substituents in the heterocyclic system, e.g. by molecule enlargement, or by incorporation of a paper-fibre-reactive group.

"Impregnation" and "development" can be effected simultaneously, or successively in any desired sequence.

According to the process of the invention, the paper materials can be dyed or printed by various methods, such as:

1. by successive application of coupling component and diazo component to the surface of the paper material in two operations;

2. by application of the one component to the paper pulp, preferably the coupling component, and subsequent application of the diazo component to the surface; and 3. by application of the one component, preferably the coupling component, in the paper-sizing press; and subsequent use of the other component, preferably the diazo component, in a printing paste.

The preferred method is method 1., whereby the two components are applied successively to the surface of the paper materials. This surface application is effected, e.g. by immersion or by spraying, with the use of known techniques. Preferably, the procedure is such that the undyed paper material is immersed successively in baths containing the coupling component and diazo component, respectively; or, alternatively, the surface of the paper material is firstly sprayed with the solution of the one component, preferably the coupling component, with the other component being subsequently applied by immersion.

A further suitable method is method 2., whereby, for example, the coupling component is added to the paper pulp during manufacture of the paper, and the diazo component applied, e.g. by immersion or by spraying, to the surface of the paper.

Suitable paper materials are, in particular:

(a) paper in the form of writing paper, printing paper, accounting paper, poster paper, etc., of ca. 5–180 g/m$^2$, whereby sized, unsized, wood-free or wood-containing qualities are applicable;

(b) semi-cardboard of ca. 180–300 g/m$^2$; and (c) cardboard of ca. 300–1800 g/m$^2$.

Very stable dyeings are obtained by the process according to the invention, and the material in the case of paper is well dyed throughout.

The possibility of being able to obtain by the condensation of just one of the defined colourless coupling components with different diazo components a range of colours from yellow to black, and likewise the possibility of effecting a rapid change of colour, are factors which render the process according to the invention commercially important. A further factor to be taken into account, moreover, is that, compared with conventional processes, the process according to the invention offers advantages with respect to the maintaining of clean waste liquor, since, with this method of paper dyeing, practically no chemicals or dyestuffs can contaminate the waste water.

In the case of application of the coupling component to the paper pulp, the paper-fibre suspension contains, in addition to cellulose, the usual additives, such as fillers, e.g. kaolin, barium sulphate and titanium dioxide; sizing agents, e.g. a rosin size based on collophony, or a synthetic sizing agent based on polyacrylate, polyester, epoxide or ethyleneimine; fixing agents, e.g. potassium aluminium sulphate; a retention agent, e.g. a reaction product of dicyanodiamide/ ammonium chloride/formaldehyde; or wet-strength agents, etc.

As a rule, 1 to 3% of the coupling component, relative to the weight of the dry paper, is used in the paper pulp. And in the immersion process, 10 to 30 g/l of coupling component and diazo component, respectively, has proved satisfactory.

The following examples illustrate the invention but do not in any way limit its scope. Where not otherwise stated, percentages are expressed as percent by weight.

EXAMPLE 1

An amount of 300 liters of a 2% aqueous coupling-component solution (2,6-dihydroxy-3-methylpyridine) is fed into a vat containing 30,000 liters of water, 1200 kg of sulphite cellulose and 240 kg of filler (kaolin). After a mixing time of 5 minutes, additions are made firstly of 342 liters of a 7% rosin size solution based on partially saponified collophony and then, after a further 10 minutes, of 192 liters of a 25% solution of KAl (SO$_4$)$_2$·12H$_2$0. (paper sizing)

After the fibre suspension has been diluted to 0.9% pulp consistency, it is dewatered on the wire cloth of a paper machine; further amounts of water are removed from the formed fibre structure by pressing. The resulting paper web is dried in the main part of the dry end of the paper machine until a dry content of 95% is obtained, before it passes through the sizing press, mounted in the paper machine, in which there is a circulation of a 0.5% aqueous solution of 4-(4'-methoxyphenylamino)-aniline. There then occurs a coupling of the coupling component present in the paper with the 4-(4'-methoxy-phenylamino)-aniline of the sizing-press solution. The result of this coupling is a rapid dye development. The paper web dyed according to this principle is finish dried in the afterdrying part following the sizing press treatment, and subsequently rolled up. A paper dyed in a pastel shade of blue having good fastness to water is obtained.

EXAMPLE 2

The paper is run only soft-sized in order to ensure the necessary adsorption during the immersion operations.

The fibre suspension as described in Example 1, but without addition of a coupling component, is diluted to 0.9% pulp consistency and fed to the breast box of the paper machine. An amount of 0.05% of a retention agent (condensation product from 1 mole of dicyanodiamide, 1 mole of NH$_4$Cl and 2 moles of formaldehyde), relative to the dry fibre, is measured in at this point in order to retain the kaolin. The paper web is subsequently formed in the usual manner.

The paper web leaving the main part of the drying section is passed through the sizing press incorporated in the paper machine, in which a 2% aqueous solution of the coupling component (2,6-dihydroxy-3-cyano-4-methylpyridine) is circulating; the paper web is then finish dried and rolled up.

In a separate operation, the paper is passed through an immersion bath, in which a 2% aqueous solution of the diazonium salt (2-methoxy-4-benzoylamino-5-methylaniline), which contains 100 g of starch per liter, circulates. (In place of starch, a synthetic sizing agent compatible with diazo salts, e.g. one based on polyacrylates, can be used.)

The dyed paper is then dried and rolled up; the result is a deep red dyeing. It is naturally possible to carry out the dyeing in a single operation. The condition for this is the presence of a second sizing press, or similar device, within the paper machine.

If a semi-cardboard or a cardboard is used instead of paper, with otherwise the same procedure, then a similarly good result is obtained.

EXAMPLE 3

The paper is run as in Example 2. Directly after the last wet press, however, the wet paper web (ca. 40% dry content) is finely sprayed with a 1% aqueous solution of 2,6-dihydroxy-3-cyano-4-methylpyridine, so that 0.05 liters of solution per square meter is transferred to the web. After the subsequent drying treatment, the paper web is fed through the sizing press or similar device, mounted in the paper machine, in which a 1% aqueous solution of 2-chloroaniline-hydrochloride containing 100 g of starch per liter is circulating. (Instead of starch, it is possible to use a synthetic sizing agent compatible with diazo salts, e.g. one based on polyacrylates.)

The paper is then dried and rolled up ready for further processing. The result is a paper dyed in a yellow of medium depth of colour, which has good fastness to water.

EXAMPLE 4

Each of the papers to which the coupling component has been applied according to the Examples 1 to 3 is printed with a printing paste of the following composition:
40 g of 2-chloroaniline-hydrochloride,
50 g of urea,
10 g of acetic acid (80%),
300 g of water, and
400 g of thickener (flour derivative)

The result after drying is a yellow-printed paper possessing good fastness properties.

EXAMPLE 5

Paper is run soft-sized in order to ensure the necessary adsorption during the immersion operations.

The fibre suspension as described in Example 1, but without addition of a coupling component, is diluted to 0.9% pulp consistency and fed to the breast box of the paper machine. An amount of 0.05% of a retention agent (condensation product from 1 mole of dicyanodiamide, 1 mole of NH$_4$Cl and 2 moles of formaldehyde), relative to the dry fibre, is measured in at this point in order to retain the kaolin. The paper web is subsequently formed in the usual manner.

The paper web leaving the main part of the drying section is passed through the sizing press incorporated in the paper machine, in which a 2% aqueous solution of the coupling component of the formula

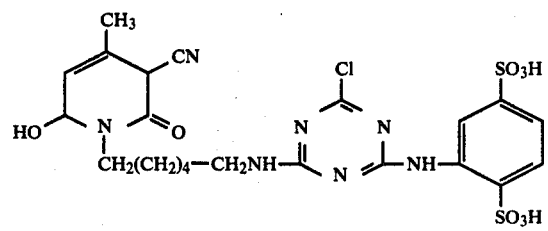

is circulating; the paper web is then finish dried and rolled up.

In a separate operation, the thus impregnated paper is passed through an immersion bath, in which a 2% aqueous solution of a diazonium salt according to the following Table I, which contains 100 g of starch per liter, circulates.

The dyed paper is then dried and rolled up; the resulting shades are given in the second column of the table:

TABLE I

| Diazonium salt | Shade of colour |
|---|---|
| 2-chloroaniline | greenish yellow |
| 4-methoxy-3-amino-phenyl benzyl sulfone | greenish yellow |
| 4-nitroaniline | greenish brilliant yellow |
| 1-aminoanthraquinone | reddish yellow |

TABLE I-continued
| Diazonium salt | Shade of colour |
|---|---|
| 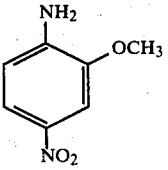 | yellow |
| 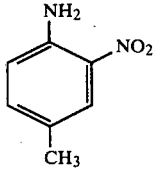 | neutral yellow |
| 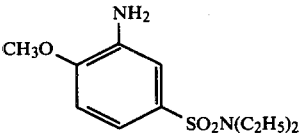 | neutral yellow |
| 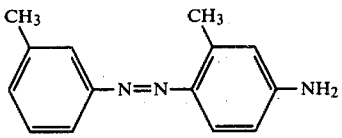 | orange |
| 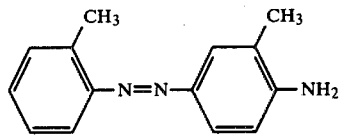 | orange |
| 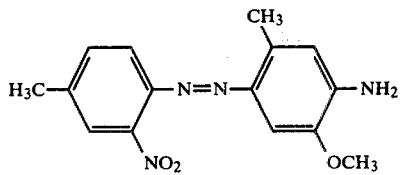 | red-brown |
| 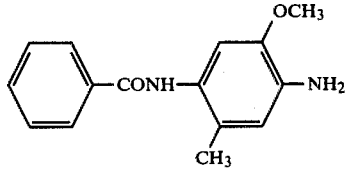 | scarlet |
| 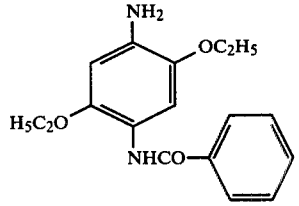 | ruby |
| 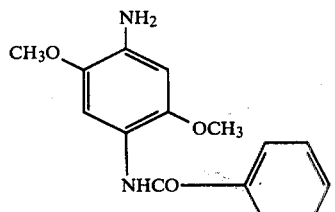 | ruby |

TABLE I-continued

| Diazonium salt | Shade of colour |
|---|---|
| CH₃O—⟨C₆H₄⟩—NH—⟨C₆H₄⟩—NH₂ | violet |
| ⟨C₆H₅⟩—NH—⟨C₆H₃(OCH₃)⟩—NH₂ | blue |
| ⟨C₆H₅⟩—NH—⟨C₆H₄⟩—NH₂ | violet |
| O₂N—⟨C₆H₂(Cl)₂⟩—N=N—⟨C₆H₂(OCH₃)₂⟩—NH₂ | claret |
| H₂N—⟨C₆H₄⟩—N=N—⟨C₆H₄⟩—N=N—⟨C₆H₂(OCH₃)(CH₃)⟩—NH₂ | claret |
| O₂N—⟨C₆H₄⟩—N=N—⟨C₆H₂(OCH₃)₂⟩—NH₂ | ruby |

If, instead of the coupling component given in Example 5, there is used a coupling component of the formula

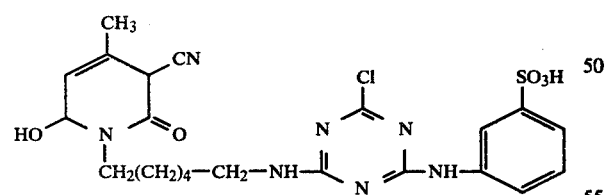

or

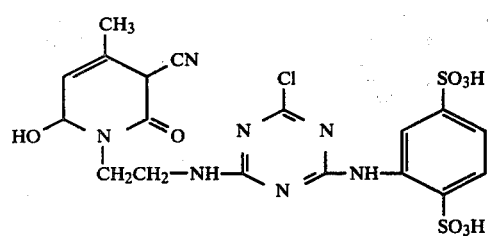

with otherwise the same procedure, then similar results are obtained.

EXAMPLE 6

Paper is run soft-sized in order to ensure the necessary adsorption during the immersion operations.

The fibre suspension as described in Example 1, but without addition of a coupling component, is diluted to 0.9% pulp consistency and fed to the breast box of the paper machine. An amount of 0.05% of a retention agent (condensation product from 1 mole of dicyanodiamide, 1 mole of NH₄Cl and 2 moles of formaldehyde), relative to the dry fibre, is measured in at this point in order to retain the kaolin. The paper web is subsequently formed in the usual manner.

The paper web leaving the main part of the drying section is passed through the sizing press incorporated in the paper machine, in which a 2% aqueous solution of the coupling component of the formula

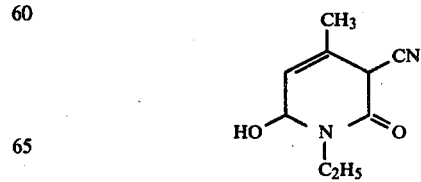

is circulating; the paper web is then finish dried and rolled up.

In a separate operation, the thus impregnated paper is passed through an immersion bath, in which a 2% aqueous solution of a diazonium salt according to the following Table II, which contains 100 g of starch per litre, circulates.

The dyed paper is then dried and rolled up; the resulting shades are given in the second column of the table:

TABLE II

| Diazonium salt | Shade of colour |
| --- | --- |
| 3,5-bis(trifluoromethyl)aniline (NH₂ with F₃C and CF₃ at 3,5-positions) | greenish yellow |
| 2-nitroaniline (NH₂, NO₂ ortho) | yellow |
| 2-methoxy-5-nitroaniline (NH₂, OCH₃, O₂N) | brilliant gold-yellow |
| 2-methoxy-5-(benzylsulfonyl)aniline (NH₂, CH₃O, SO₂—CH₂—C₆H₅) | brilliant yellow |
| 5-chloro-2-methoxyaniline (NH₂, OCH₃, Cl) | brilliant orange |
| 1-aminoanthraquinone | brilliant gold-yellow |
| 2-methoxy-4-nitroaniline (NH₂, OCH₃, NO₂) | orange |
| 4-chloro-2-(4-chlorophenoxy)aniline·HCl (NH₂(HCl), O—C₆H₄—Cl, Cl) | brilliant gold-yellow |
| 4-methoxy-3-amino-N,N-diethylbenzenesulfonamide (NH₂, CH₃O, SO₂N(C₂H₅)₂) | orange |

TABLE II-continued

| Diazonium salt | Shade of colour |
|---|---|
| 4-methylphenyl–N=N–(2-methyl-4-aminophenyl) | orange |
| 2-methylphenyl–N=N–(3-methyl-4-aminophenyl) | brilliant scarlet |
| 4-methyl-2-nitrophenyl–N=N–(2-methyl-4-amino-5-methoxyphenyl) | red-brown |
| 4-amino-2,5-dimethoxybenzonitrile·HCl | brilliant orange |
| N-benzoyl-4-amino-5-methoxy-2-methylaniline (benzamide with OCH₃, NH₂, CH₃ substituents) | scarlet |
| 1-benzamido-4-amino-2,5-diethoxybenzene | ruby |
| 1-benzamido-4-amino-2,5-dimethoxybenzene | ruby |
| 3,3'-dimethoxybenzidine | claret |
| 4-methoxy-4'-aminodiphenylamine | brilliant violet |

TABLE II-continued

| Diazonium salt | Shade of colour |
|---|---|
| 3-methoxy-4-amino-4'-phenylaminodiphenylamine structure (Ph–NH–C6H3(OCH3)–NH2) | violet |
| 4-amino-4'-phenylaminodiphenylamine (Ph–NH–C6H4–NH2) | violet |
| 2,6-dichloro-4-nitrophenylazo-(2,5-dimethoxy-4-amino)benzene | claret |
| Ph–N=N–C6H4–N=N–(2-methyl-5-methoxy-4-amino)benzene | blue |
| 4-nitrophenylazo-(2,5-dimethoxy-4-amino)benzene | ruby |

If, instead of the coupling component given in Example 6, a coupling component of the formula

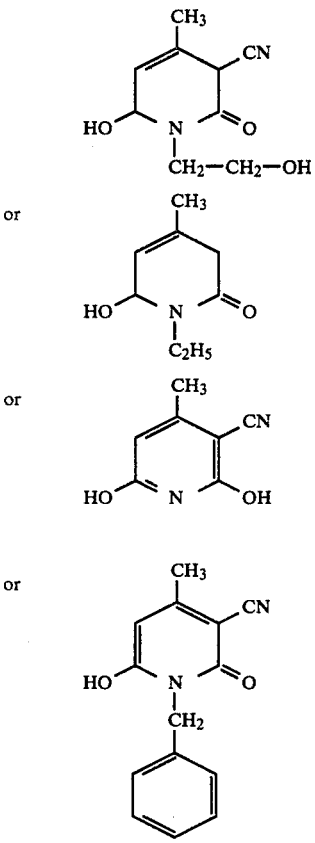

is used, with otherwise the same procedure, then similar results are obtained.

What we claim is:

1. A process for dyeing or printing paper in different hues, using a single coupling component, comprising the steps of (1) Applying to the paper a single coupling component selected from the group consisting of

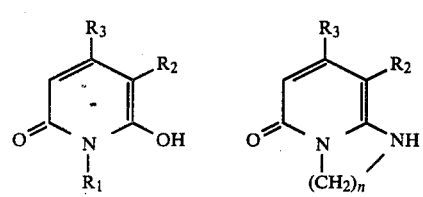

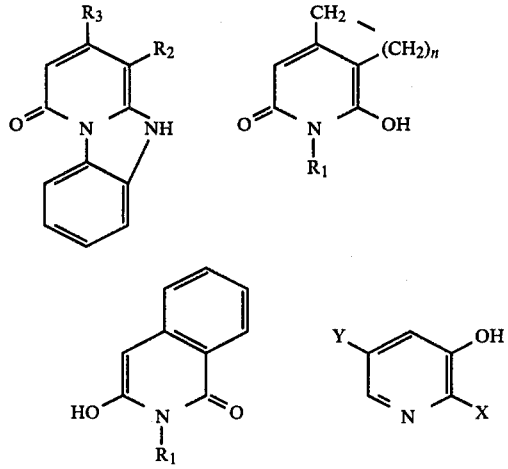

wherein
$R_1$ is hydrogen, an alkyl group, an acylaminoalkyl group, an aralkyl group, an aryl radical, a heterocyclic radical, an alkylene radical which links the radical of the elected formula with a further similar heterocyclic radical, or an amino group;
$R_2$ is hydrogen, an alkyl group, cyclohexyl, cyano nitro, nitroso, $H_2N$-, acylamino group, an alkyl carbonyl or arylcarbonyl group, a sulphonyl group, an aminosulphonyl group, an alkoxycarbonyl or aryloxycarbonyl group, an aminocarbonyl group, a halogen atom, a sulphoalkyl group, a haloalkanoylaminomethyl group, a quaternary ammoniumalkanoylaminomethyl group, a sulfoalkanoylaminomethyl group, a phthalimidomethyl group, an o-benzene disulfonimidomethyl group, a sulfonic acid group, a carboxyl group, a quaternized amino group, a pyridinium group or benzimidazolium group;
$R_3$ is hydrogen, an alkyl group, an aralkyl radical, an aryl radical, a heterocyclic radical, cyano, an alkoxycarbonyl or aryloxycarbonyl group, an aminocarbonyl group, an alkoxycarbonylmethyl or aryloxycarbonylmethyl group, cyanomethyl, an acylmethyl group, aminocarbonylmethyl, carboxy or hydroxymethyl;
n is 2 or 3;
x is hydroxy or amino; and
Y is hydrogen or halogen;

(2) Applying to one area of the paper a first diazo compound to give one hue in the area where the coupling component and the first diazo compound are applied; and (3) Applying to a second area of the paper a second diazo compound to give a second hue in the area where the coupling component and the second diazo compound are applied.

2. The process of claim 1, wherein one of the diazo compounds used is a benzenediazonium salt or a naphthalenediazonium salt.

3. The process of claim 1, comprising the application to the paper to be dyed or printed firstly of the coupling component and then of the diazo compounds, these being applied successively to the surface in two operations.

* * * * *